(12) United States Patent
Chiang (10) Patent No.: US 10,053,054 B1
(45) Date of Patent: Aug. 21, 2018

(54) CHILD CAR SEAT FOR LOCK-IN PREVENTION

(71) Applicant: Shang-jen Chiang, New Taipei (TW)

(72) Inventor: Shang-jen Chiang, New Taipei (TW)

(73) Assignee: Preemptec Corporation, Hacienda Heights, CA (US)

( * ) Notice: Subject to any disclaimer, the term of this patent is extended or adjusted under 35 U.S.C. 154(b) by 0 days.

(21) Appl. No.: 15/702,072

(22) Filed: Sep. 12, 2017

(51) Int. Cl.
*B60R 22/48* (2006.01)
*B60R 22/10* (2006.01)

(52) U.S. Cl.
CPC .......... *B60R 22/48* (2013.01); *B60R 22/105* (2013.01); *B60R 2022/4816* (2013.01); *B60R 2022/4883* (2013.01)

(58) Field of Classification Search
None
See application file for complete search history.

(56) References Cited

U.S. PATENT DOCUMENTS

| | | | | |
|---|---|---|---|---|
| 5,161,855 A * | 11/1992 | Harmon | ............... | B60N 2/3084 297/238 |
| 5,406,252 A * | 4/1995 | Dear | ....................... | B60R 22/48 200/61.58 B |
| 6,922,147 B1 * | 7/2005 | Viksnins | ................ | B60N 2/002 180/272 |
| 6,924,742 B2 * | 8/2005 | Mesina | .................. | B60N 2/002 340/457.1 |
| 7,002,457 B2 * | 2/2006 | Stevenson | ............... | B60R 22/48 180/286 |
| 7,265,671 B1 * | 9/2007 | Valles | ..................... | B60N 2/002 340/309.16 |
| 7,642,907 B2 * | 1/2010 | Tang | ....................... | B60R 22/48 340/438 |
| 8,190,332 B2 * | 5/2012 | Saban | ..................... | B60N 2/002 297/217.3 |
| 8,427,294 B2 * | 4/2013 | Cheung | .............. | A44B 11/2569 340/457.1 |
| 8,816,839 B1 * | 8/2014 | Rick | ....................... | F16B 17/00 180/268 |
| 8,841,997 B2 * | 9/2014 | Silveira | .................. | B60N 2/002 340/457 |
| 9,014,920 B1 * | 4/2015 | Torres | ................. | G08B 21/0202 701/45 |
| 9,415,748 B2 * | 8/2016 | Sugawara | ............... | B60R 22/48 |
| 9,527,477 B1 * | 12/2016 | Cech | ....................... | B60R 22/48 |
| 9,663,032 B1 * | 5/2017 | Appukutty | ............... | B60Q 9/00 |
| 2004/0095252 A1 * | 5/2004 | Kraljic | .................... | G08B 21/22 340/687 |

(Continued)

*Primary Examiner* — Peter D Nolan
(74) *Attorney, Agent, or Firm* — Osha Liang LLP (57) ABSTRACT

A smart seat buckle is disclosed. The smart seat buckle includes a number of connector elements configured to fasten a user to a seat when the smart seat buckle is in a fastened position, a sensor switch coupled to the connector elements and configured to detect the fastened position of the smart seat buckle, and switch on battery power to a battery powered transmitter when the smart seat buckle is in the fastened position, and the battery powered transmitter configured to transmit a signal to prevent locking of a vehicle door from outside of the vehicle, when the battery power of the transmitter is switched on, in response to the sensor switch detecting the fastened position of the smart seat buckle.

14 Claims, 5 Drawing Sheets

(56) References Cited

U.S. PATENT DOCUMENTS

| | | | |
|---|---|---|---|
| 2004/0119599 A1* | 6/2004 | Stevenson | B60R 22/48 340/686.1 |
| 2004/0164856 A1* | 8/2004 | Mesina | B60N 2/002 340/457.1 |
| 2006/0061201 A1* | 3/2006 | Skinner | B60R 22/00 297/468 |
| 2007/0222622 A1* | 9/2007 | Sweeney | B60N 2/002 340/573.1 |
| 2009/0093932 A1* | 4/2009 | McCall | B60R 22/48 701/45 |
| 2009/0259369 A1* | 10/2009 | Saban | B60N 2/002 701/45 |
| 2013/0033373 A1* | 2/2013 | Thomas | B60N 2/002 340/457.1 |
| 2013/0106598 A1* | 5/2013 | Silveira | B60N 2/28 340/457.1 |
| 2013/0314223 A1* | 11/2013 | Masudaya | B60R 22/48 340/457.1 |
| 2014/0015664 A1 | 1/2014 | Watson | |
| 2014/0052342 A1* | 2/2014 | Seibert | B60N 2/002 701/45 |
| 2015/0145666 A1* | 5/2015 | Sugawara | B60R 22/48 340/457.1 |
| 2015/0363986 A1* | 12/2015 | Hoyos | G07C 9/00563 340/5.61 |
| 2016/0121848 A1* | 5/2016 | Seibert | B60N 2/002 340/457 |
| 2016/0355157 A1* | 12/2016 | Cech | B60R 22/48 |
| 2017/0021800 A1* | 1/2017 | Seibert | B60N 2/002 |
| 2017/0129399 A1* | 5/2017 | Appukutty | B60Q 9/00 |
| 2017/0240111 A1* | 8/2017 | Appukutty | B60Q 9/00 |
| 2017/0305387 A1* | 10/2017 | Koike | B60R 22/48 |

* cited by examiner

CHILD CAR SEAT FOR LOCK-IN PREVENTION

BACKGROUND

Every year, many children unfortunately died from being stranded in their car seats under hot or cold weather when their parents or drivers of the cars forgot to take them out of the cars after parking. As the pace of people's life becoming even faster and more things distracting car drivers after parking their cars (e.g. urgent office matter causing a driver to rush to the office without noticing the child remained in the car after parking), more children may be injured or die under such circumstances in the future.

SUMMARY

In general, in one aspect, the invention relates to a smart seat buckle. The smart seat buckle includes a number of connector elements configured to fasten a user to a seat when the smart seat buckle is in a fastened position, a sensor switch coupled to the connector elements and configured to detect the fastened position of the smart seat buckle, and switch on battery power to a battery powered transmitter when the smart seat buckle is in the fastened position, and the battery powered transmitter configured to transmit a signal, when the battery power of the transmitter is switched on, in response to the sensor switch detecting the fastened position of the smart seat buckle.

In general, in one aspect, the invention relates to a seat that includes (i) a smart seat buckle having a number of connector elements configured to fasten a user to the seat when the smart seat buckle is in a fastened position, and unfasten the user from the seat when the smart seat buckle is in an unfastened position, (ii) a sensor switch coupled to the connector elements and configured to detect the fastened position and the unfastened position of the smart seat buckle, switch on battery power to a battery powered transmitter when the smart seat buckle is in the fastened position, and switch off the battery power to the battery powered transmitter when the smart seat buckle is in an unfastened position, and (iii) the battery powered transmitter configured to transmit a signal, when the battery power of the transmitter is switched on, in response to the sensor switch detecting the fastened position of the smart seat buckle, and cease to transmit the signal, when the battery power of the transmitter is switched off, in response to the sensor switch detecting the unfastened position of the smart seat buckle.

In general, in one aspect, the invention relates to a method that includes (i) providing a smart seat buckle having a number of connector elements configured to fasten a user to a seat when the smart seat buckle is in a fastened position, and unfasten the user from the seat when the smart seat buckle is in an unfastened position, (ii) detecting, using a sensor switch of the smart seat buckle, the fastened position and the unfastened position, and the sensor switch configured to switch on battery power to a battery powered transmitter when the smart seat buckle is in the fastened position, and switch off the battery power to the battery powered transmitter when the smart seat buckle is in an unfastened position, (iii) transmitting, using the battery powered transmitter, a signal in response to the battery power of the transmitter being switched on when the sensor switch detects the fastened position, and (iv) stopping the battery powered transmitter from transmitting the signal in response to the battery power of the transmitter being switched off when the sensor switch detects the unfastened position.

Other aspects and advantages of the invention will be apparent from the following description and the appended claims.

BRIEF DESCRIPTION OF DRAWINGS

FIG. 1.1 shows a schematic block diagram of a lock-in prevention system in accordance with one or more embodiments of the invention.

FIG. 1.2 shows a schematic block diagram of a smart seat buckle in accordance with one or more embodiments of the invention.

FIGS. 3.1, 3.2, and 3.3 show an example in accordance with one or more embodiments of the invention.

FIGS. 4.1 and 4.2 show a computing system in accordance with one or more embodiments of the invention.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide a system, method, and computer readable medium for lock-in prevention using a smart seat buckle for a seat in a vehicle, such as a car seat in a car. In particular, the smart seat buckle solves the problem of a driver unintentionally leaving a child inside the vehicle, e.g., in the car seat. Specifically, the smart seat buckle prevents the driver from locking the car without removing the child from the car seat after parking the car. In other words, the smart seat buckle performs the lock-in prevention at the time of locking the car door, which may be the last chance for the parent or driver to avoid any unfortunate incidence. In one or more embodiments, the smart seat buckle transmits a signal (referred to as a lock-in prevention signal), when in a fastened position, where the signal interacts with a vehicle door lock, a vehicle computer, and/or a vehicle door key to prevent the vehicle door from being locked from outside of the vehicle.

Figure 11:
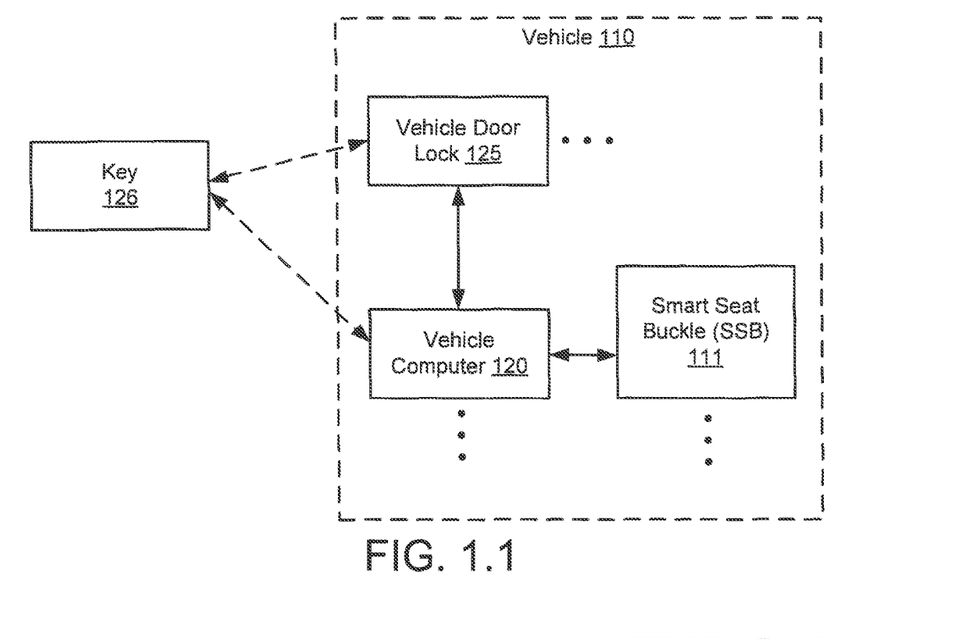

FIG. 1.1 depicts a schematic block diagram of a lock-in prevention system in accordance with one or more embodiments of the invention. In one or more embodiments of the invention, one or more of the elements shown in FIG. 1.1 may be omitted, repeated, and/or substituted. Accordingly, embodiments of the invention should not be considered limited to the specific arrangements of modules shown in FIG. 1.1.

As shown in FIG. 1.1, the lock-in prevention system includes a vehicle (110) and a key (126) of the vehicle (110). For example, the vehicle (110) may be a car, truck, boat, airplane, etc. The key (126) may be a physical key such as an electronic key or a mechanical key, or a nonphysical key such as a pass code or fingerprint recognition process. In one or more embodiments of the invention, the vehicle (110) includes a vehicle door lock (125), a vehicle computer (120), and a smart seat buckle (SSB) (111). The vehicle (110) may further includes a door (e.g., locked/unlocked by the vehicle door lock (125)), a user (e.g., a child), and a seat (e.g., child seat) that are not explicitly shown in FIG. 1.1.

In one or more embodiments, the vehicle computer (120) is a electronic and/or computing device including hardware and/or software components used to control various functions of the vehicle (110), such as navigation function, climate control function, security function, etc. In particular, the security function includes locking/unlocking functions of the vehicle door lock (125). In one or more embodiments, the vehicle computer (120) is configured to prevent, in response to a signal (i.e., the lock-in prevention signal) transmitted from the SSB (111), locking of the vehicle door lock (125) from outside of the vehicle (110). For example, the vehicle computer (120) may deactivates an exterior locking function of the door, or more specifically the vehicle door lock (125). In another example, the vehicle computer (120) may block an exterior locking signal transmitted from the key (126) or other locking apparatus (e.g., keypad of the vehicle door lock (125)) outside of the vehicle (110).

In one or more embodiments, the door may be locked and/or unlocked by physically engaging, from outside of the vehicle (110), a mechanical key (i.e., key (126)) with (e.g., inserting into) a locking/unlocking mechanism (not shown) of the vehicle door lock (125). The locking/unlocking functions using the mechanical key may be disabled or enabled by the vehicle computer (120) controlling the vehicle door lock (125). In such embodiments, in response to the lock-in prevention signal, the vehicle computer (120) may disable the locking function of the locking mechanism.

In one or more embodiments, the door may be locked and/or unlocked by engaging (e.g., using electronic signal(s)), from outside of the vehicle (110), an electronic key (i.e., key (126)) with the vehicle computer (120), which in turn activates/deactivates the locking/unlocking mechanism of the vehicle door lock (125). In such embodiments, in response to the lock-in prevention signal, the vehicle computer (120) may block, or otherwise ignore, the electronic signal(s) from the electronic key (i.e., key (126)). Alternatively, the key (126) may receive the lock-in prevention signal and refrain from sending any electronic signal(s) to the vehicle computer (120) for locking the door.

In one or more embodiments, the vehicle computer (120) may decode or recognize the pass code or the fingerprint (i.e., key (126)) entered or pressed, from outside of the vehicle (110), via a keypad (not shown) of the vehicle door lock (125). Based on the pass code or the fingerprint recognition, the vehicle computer (120) may activate/deactivate the locking/unlocking mechanism of the vehicle door lock (125). In such embodiments, in response to the lock-in prevention signal, the vehicle computer (120) may block, or otherwise ignore, the pass code or the fingerprint recognition from the keypad.

In one or more embodiments, the vehicle door lock (125) and the vehicle computer (120) are separate from each other. For example, the vehicle door lock (125) and the vehicle computer (120) may communicate with each other via wired and/or wireless signal(s). In one or more embodiments, at least a portion of the vehicle computer (120) is integrated with the vehicle door lock (125).

Figure 12:
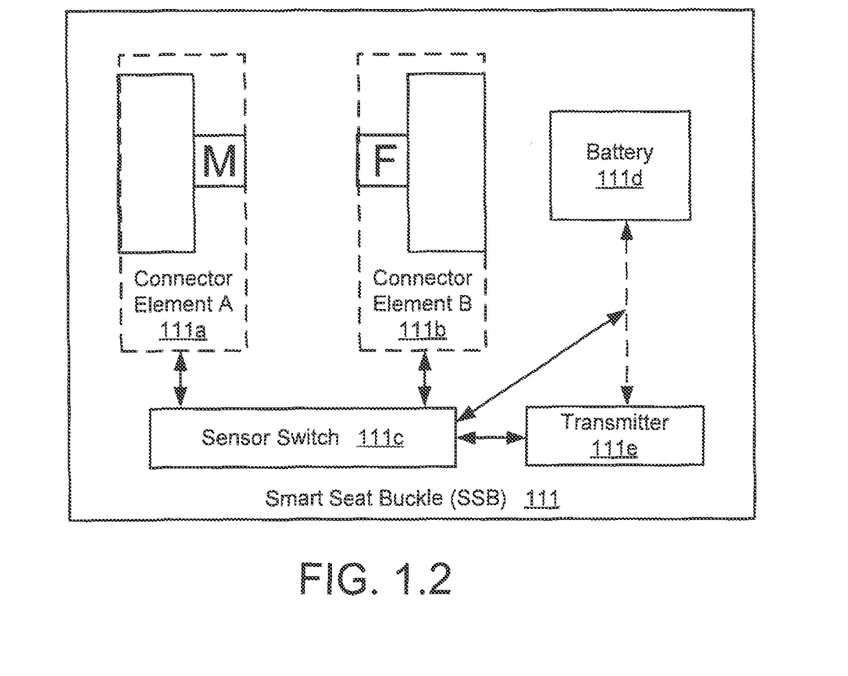

In one or more embodiments, the SSB (111) is an assembly that connects/disconnects two or more belt/harness ends of a seat belt system or a safety harness of the seat (e.g., child seat) inside the vehicle (110). Elements of the SSB (11) are described in reference to FIG. 1.2 below.

FIG. 1.2 depicts a schematic block diagram of the smart seat buckle (111) depicted in FIG. 1.1 above. In one or more embodiments of the invention, one or more of the elements shown in FIG. 1.2 may be omitted, repeated, and/or substituted. Accordingly, embodiments of the invention should not be considered limited to the specific arrangements of modules shown in FIG. 1.2.

In one or more embodiments of the invention, the smart seat buckle (SSB) (111) includes connector elements (e.g., connector element A (111a), connector element B (111b)), a sensor switch (111c), and a battery powered transmitter (111e) powered by the battery (111d). The connector elements (e.g., connector element A (111a), connector element B (111b)) are physical objects configured to fasten a user (e.g., child) to a seat (e.g., child seat) when the SSB (111) is in a fastened position. For example, the connector element A (111a) (denoted 'M') and connector element B (111b) (denoted 'F') may be a male end and female end, respectively, of a seat belt system or a safety harness. The fastened position corresponds to the male end and female end engaging with each other securely.

In one or more embodiments, the sensor switch (111c) is an electronic switching circuit coupled to the connector elements (e.g., connector element A (111a), connector element B (111b)) and configured to detect the fastened position of the SSB (111) based on a sensing mechanism. The sensing mechanism may be based on electrical sensing, magnetic sensing, Hall effect sensing, mechanical sensing, etc. The sensor switch (111c) switches on battery power from the battery (111d) to the battery powered transmitter (111e) when the SSB (111) is in the fastened position. In one or more embodiments, the connector element A (111a) and connector element B (111b) include a metallic pin (e.g., denoted as 'M') and a metallic socket (e.g., denoted as 'F') that form an electrical connection when engaged. For example, the sensor switch (111c) may detect the fastened position based on passing an electrical current through the electrical connection (i.e., electrical sensing). In another example, the sensor switch (111c) may allow the battery (111d) to supply electrical power to the transmitter (111e) through the electrical connection. In an example configuration, the metallic pin is electrically connected to the battery (111d) while the metallic socket is electrically connected to the transmitter (111e). Accordingly, the battery (111d) is electrically connected to the transmitter (111e) through the engaged metallic pin and the metallic socket when the SSB (111) is in the fastened position.

The battery powered transmitter (111e) is configured to transmit a signal (i.e., the lock-in prevention signal), when the battery power of the transmitter is switched on, in response to the sensor switch (111c) detecting the fastened position of the SSB (111). As described in reference to FIG. 1.1 above, the lock-in prevention signal interacts with the vehicle door lock, the vehicle computer (120), and/or the key (126) to prevent the vehicle door from being locked from outside of the vehicle (110).

In one or more embodiments of the invention, the connector elements (e.g., connector element A (111a), connector element B (111b)) are further configured to unfasten the user (e.g., the child) from the seat (e.g., the child seat) when the SSB (111) is in an unfastened position, the sensor switch (111c) is further configured to detect the unfastened position of the SSB (111) and to switch off the battery power from the battery (111d) to the battery powered transmitter (111e) when the SSB (111) is in the unfastened position, and the battery powered transmitter (111e) is further configured to cease to transmit the lock-in prevention signal, when the battery power of the transmitter (111e) is switched off, in response to the sensor switch (111c) detecting the unfastened position of the SSB (111).

An example of the SSB (111) is described in reference to FIGS. 3.1-3.3 below. In one or more embodiments, the SSB (111), the key (126), and the vehicle computer (120) are used to perform the aforementioned functions based on the method described in reference to FIG. 2 below.

Figure 2:
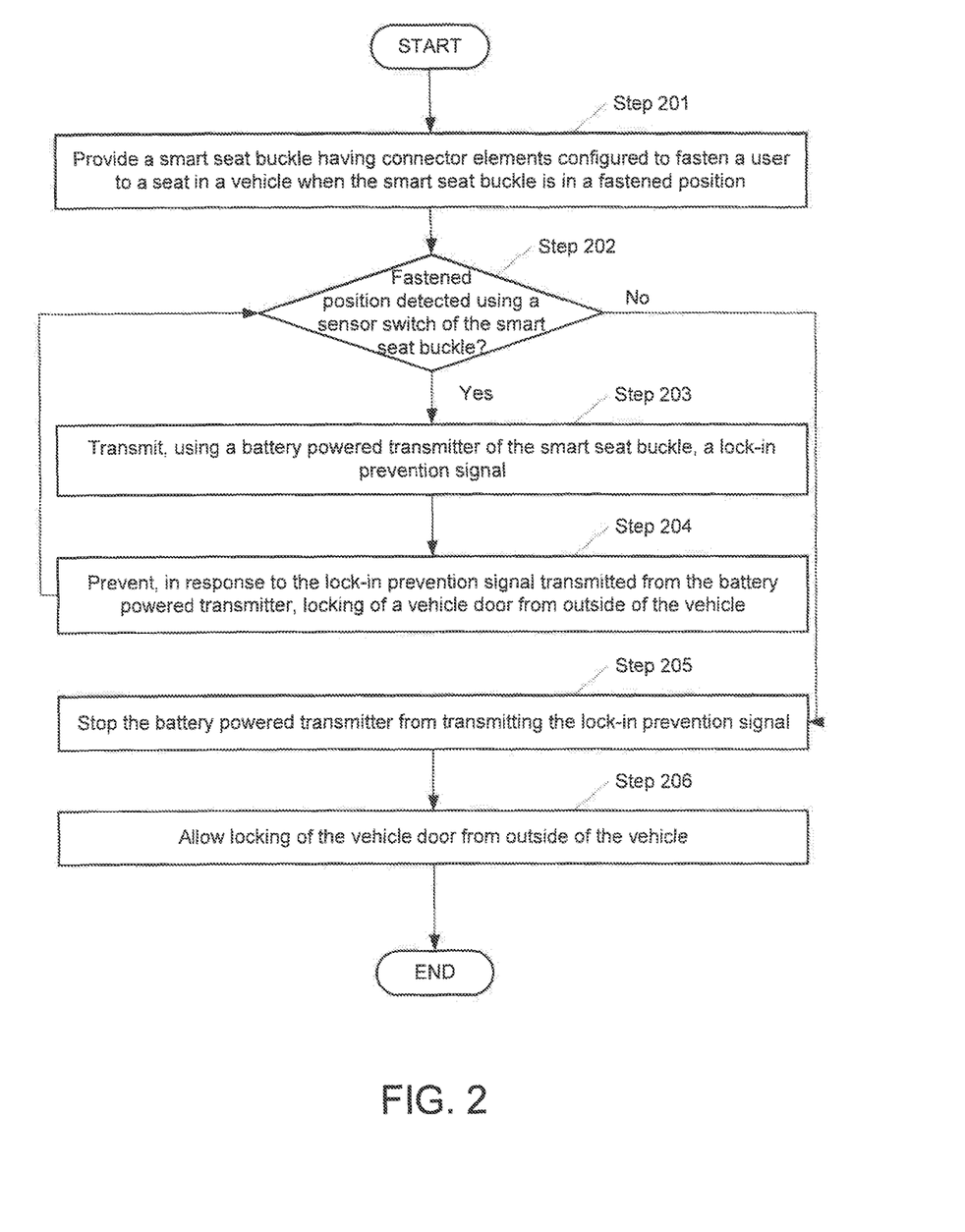
FIG. 2 shows a method flow chart in accordance with one or more embodiments of the invention.

FIG. 2 shows a method flow chart in accordance with one or more embodiments of the invention. In one or more embodiments, one or more of the steps shown in FIG. 2 may be omitted, repeated, and/or performed in a different order. Accordingly, embodiments of the invention should not be considered limited to the specific arrangements of steps shown in FIG. 2. In one or more embodiments, the method flow chart may be practiced using the lock-in prevention system and smart seat buckle depicted in FIGS. 1.1 and 1.2 above, and/or the computing system(s) depicted in FIGS. 4.1 and 4.2 below.

Initially in Step 201, a smart seat buckle is provided that have connector elements configured to (i) fasten a user to a seat when the smart seat buckle is in a fastened position, and (ii) unfasten the user from the seat when the smart seat buckle is in an unfastened position. In one or more embodiments, the smart seat buckle is provided as a part of a seat belt of a vehicle, a part of a safety harness of a child seat, or a part of a passenger restraining apparatus of the vehicle. In one or more embodiments, the child seat and/or the passenger restraining apparatus are removable from the vehicle. In one or more embodiments, the child seat and/or the passenger restraining apparatus are permanently installed in the vehicle.

In Step 202, a determination is made as to whether the fastened position is detected using a sensor switch. In one or more embodiments, the sensor switch is integrated in the smart seat buckle to detect the fastened position. In one or more embodiments, the sensor switch is separate from the smart seat buckle to detect the fastened position. If the determination is positive, i.e., the fastened position is detected, the method proceeds to Step 203. If the determination is negative, i.e., the fastened position is not detected, the method proceeds to Step 205.

In Step 203, using the battery powered transmitter, a lock-in prevention signal is transmitted. In one or more embodiments, using the sensor switch, battery power to a battery powered transmitter is switched on when the smart seat buckle is in the fastened position. For example, the sensor switch may connect the battery to the transmitter. Accordingly, the lock-in prevention signal is generated by the transmitter in response to the battery power of the transmitter being switched on when the sensor switch detects the fastened position.

In one or more embodiments, battery power is continuously supplied to the battery powered transmitter regardless whether the smart seat buckle is in the fastened position or not. In such embodiments, using the sensor switch, the battery powered transmitter is enabled when the smart seat buckle is in the fastened position. For example, the sensor switch may switch on an enable signal of the transmitter. Accordingly, the lock-in prevention signal is generated by the transmitter in response to the enable signal of the transmitter being switched on when the sensor switch detects the fastened position.

In Step 204, in response to the signal transmitted from the battery powered transmitter, locking of a vehicle door from outside of the vehicle is prevented. In one or more embodiments, locking of the vehicle door from outside of the vehicle is prevented by using the lock-in prevention signal to deactivate an exterior locking function of the vehicle door. For example, the lock-in prevention signal may be received by a vehicle computer and cause the vehicle computer to deactivate the exterior locking function of the vehicle door.

In one or more embodiments, locking of the vehicle door from outside of the vehicle is prevented by using the lock-in prevention signal to block an exterior signal transmitted to the vehicle door lock from a key or other locking apparatus outside of the vehicle. For example, the lock-in prevention signal may be received by the vehicle computer and prevent the vehicle computer to relay the exterior signal from the key or other locking apparatus outside of the vehicle to the vehicle door lock. In another example, the lock-in prevention signal may be received by the key or other locking apparatus outside of the vehicle and prevent the key or other locking apparatus to transmit the exterior signal to the vehicle door lock.

In Step 205, the battery powered transmitter is stopped from transmitting the lock-in prevention signal when the sensor switch does not detect the fastened position, i.e., when the sensor switch detects an unfastened position of the smart seat buckle.

In Step 206, locking of the vehicle door from outside of the vehicle is enabled without the lock-in prevention signal. In other words, the exterior locking function of the vehicle door is activated without the lock-in prevention signal. For example, without receiving the lock-in prevention signal, the vehicle computer proceeds to activate the exterior locking function of the vehicle door.

In one or more embodiments of the invention, a children car seat includes a seat base and a lap/shoulder seat belt with a locking buckle. When using the children car seat, the adult parent or driver will place the child onto the seat base and then buckle up the seat belt. After parking the car, the driver normally will buckle off the seat belt and remove the child from the car before locking the car. By combining the door lock prevention function of the electronic keys and a battery powered SSB transmitter (i.e., transmitter of the SSB), as well as by making the buckle of the car seat as the power switch for the battery-powered SSB transmitter (i.e., the SSB transmitter will be turned on when the seat belt is buckled up and will be turned off when the seat belt is buckled off), the driver of the car will not be able to lock the car door if the child remains buckled up on the car seat inside the car as the SSB transmitter with the same door locking prevention function of an electronic key is still turned on, and the driver will need to buckle off the seat belt placed over on the child to turn off the SSB transmitter before the driver can lock the door of the car. Therefore, by installing the SSB transmitter to the children car seats, the chance for drivers to lock the doors of the cars and unintentionally leave children on the car seats inside the cars may be prevented or substantially reduced. In addition, if a family has more than one car, the SSB transmitter may be made compatible with each car of the family so the same door lock prevention function of the children car seat may work with every car of the family.

Figure 31:
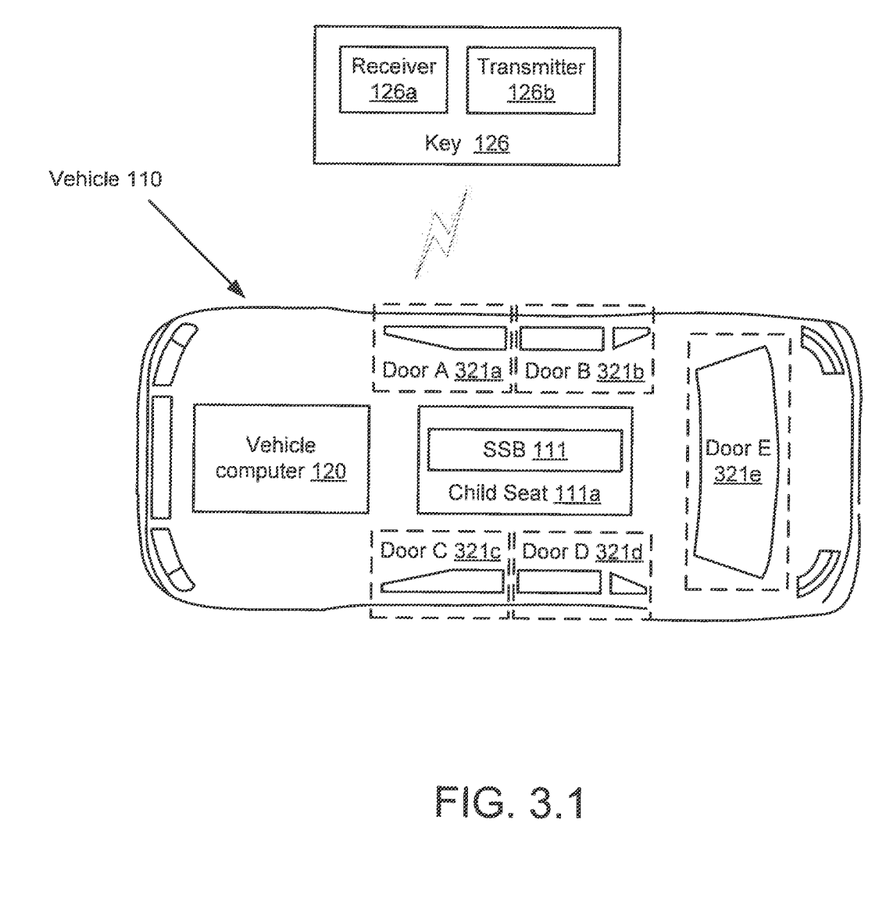

As shown in FIG. 3.1, the vehicle (110) includes the vehicle computer (120) disposed under the instrument panel/dashboard, a child seat (111a) having the SSB (11), and five vehicle doors (i.e., door A (321a), door B (321b), door C (321c), door D (321d), door E (321e)). The child seat (111a) may be a removable child seat or a built-in child seat in the vehicle (110). One or more of the door A (321a), door B (321b), door C (321c), door D (321d), and door E (321e) may include the vehicle door lock (125), or equivalent, depicted in FIG. 1.1 above.

Further as shown in FIG. 3.1, the key (126) is an electronic key including a key receiver (126a) and a key transmitter (126b). The key transmitter (126b) may transmit an electronic signal to the vehicle computer (120) to lock one or more of the vehicle doors (i.e., door A (321a), door B (321b), door C (321c), door D (321d), door E (321e)) from outside of the vehicle (110). When the SSB (111) detects the fastened position, indicating that a child may be left inside the vehicle (110), the lock-in prevention signal is transmitted from the SSB (111). For example, the lock-in prevention signal may be received by the vehicle computer (120) and causes the vehicle computer (120) to deactivate the exterior locking function of the vehicle doors (i.e., door A (321a), door B (321b), door C (321c), door D (321d), door E (321e)).

In another example, the lock-in prevention signal may be received by the vehicle computer (120) and prevents the vehicle computer (120) to relay the exterior signal from the key (126) to the vehicle door lock of the vehicle doors (i.e., door A (321a), door B (321b), door C (321c), door D (321d), door E (321e)). In yet another example, the lock-in prevention signal may be received by the key (126) and prevents the key (126) to transmit the exterior signal to the vehicle door lock of the vehicle doors (i.e., door A (321a), door B (321b), door C (321c), door D (321d), door E (321e)).

Figures 32, 33:
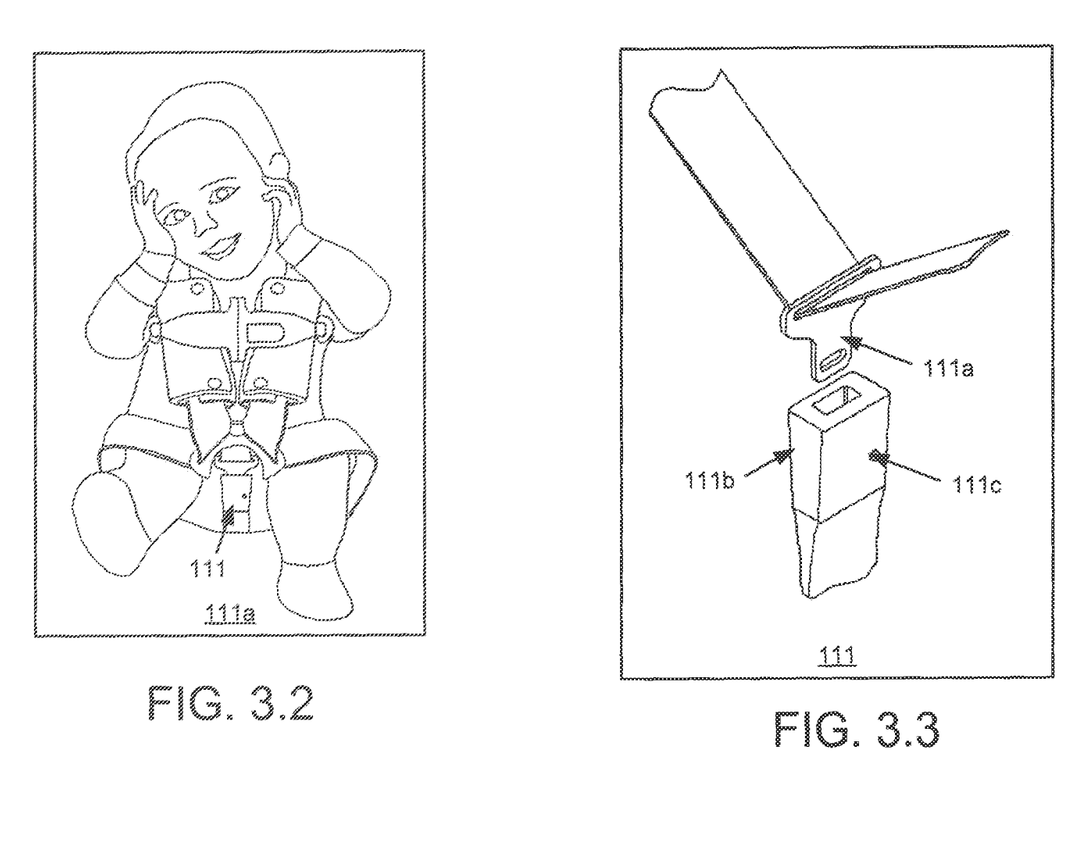

FIG. 3.2 shows an example of the child seat (111a) with a 5-point safety harness that secures a child using the SSB (111). FIG. 3.3 shows details of the SSB (111) having a metallic pin (111a) and a metallic socket (111b) that are electrically connected to the sensor switch (111c) of the SSB (111). Although electrical sensing is described in the example depicted in FIGS. 3.2 and 3.3 above, different sensing mechanisms (e.g., magnetic sensing, Hall effect sensing, mechanical sensing, etc.) may also be used.

Figure 41:
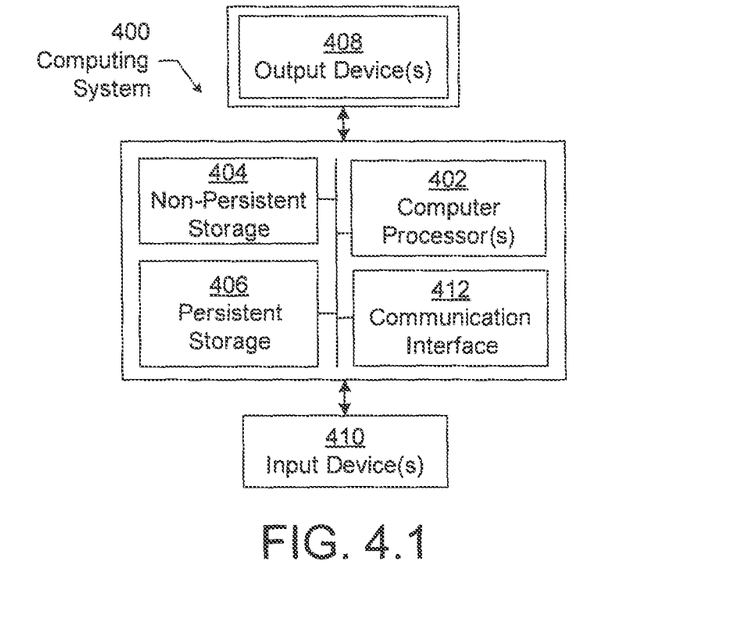

Embodiments of the invention providing a system, method, and computer readable medium for lock-in prevention using a smart seat buckle for a seat in a vehicle may be implemented on a computing system. Any combination of mobile, desktop, server, router, switch, embedded device, or other types of hardware may be used. For example, as shown in FIG. 4.1, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 42:
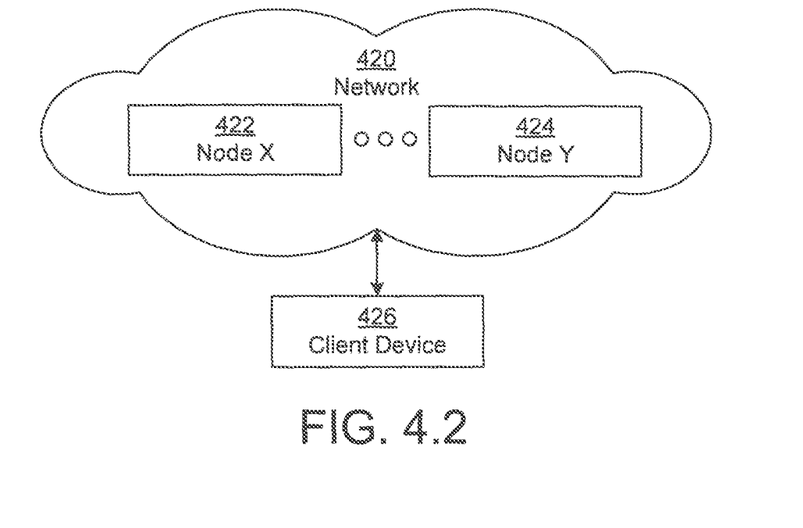

The computing system (400) in FIG. 4.1 may be connected to or be a part of a network. For example, as shown in FIG. 4.2, the network (420) may include multiple nodes (e.g., node X (422), node Y (424)). Each node may correspond to a computing system, such as the computing system shown in FIG. 4.1, or a group of nodes combined may correspond to the computing system shown in FIG. 4.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

Although not shown in FIG. 4.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4.1. Further, the client device (426) may include and/or perform all or a portion of one or more embodiments of the invention.

The computing system or group of computing systems described in FIGS. 4.1 and 4.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 4.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 4.1 and the nodes and/or client device in FIG. 4.2. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A smart seat buckle, comprising:
a plurality of connector elements configured to:
fasten a user to a seat when the smart seat buckle is in a fastened position;
a sensor switch coupled to the plurality of connector elements and configured to:
detect the fastened position of the smart seat buckle; and
switch on battery power to a battery powered transmitter when the smart seat buckle is in the fastened position; and
the battery powered transmitter configured to:
transmit a signal, when the battery power of the transmitter is switched on, in response to the sensor switch detecting the fastened position of the smart seat buckle,
wherein the signal prevents, in response to the signal transmitted from the battery powered transmitter, locking of a vehicle door from outside of the vehicle by at least blocking an exterior signal transmitted from a key or other locking apparatus outside of the vehicle, and
wherein blocking the exterior signal transmitted from the key or other locking apparatus outside of the vehicle comprises:
receiving, by the key or other locking apparatus, the signal,
wherein the received signal prevents the key or other locking apparatus from transmitting the exterior signal.

2. The smart seat buckle of claim 1,
the plurality of connector elements further configured to:
unfasten the user from the seat when the smart seat buckle is in an unfastened position,
the sensor switch further configured to:
detect unfastened position of the smart seat buckle; and
switch off the battery power to the battery powered transmitter when the smart seat buckle is in an unfastened position, and
the battery powered transmitter further configured to:
cease to transmit the signal, when the battery power of the transmitter is switched off, in response to the sensor switch detecting the unfastened position of the smart seat buckle.

3. The smart seat buckle of claim 1, wherein the plurality of connector elements comprise:
a male connector element and a female connector element, wherein the fastened position corresponds to the male connector element engaged with the female connector element based on a metallic contact,
wherein the fastened position is detected by the sensor switch based on the metallic contact of the male connector element and the female connector element.

4. The smart seat buckle of claim 1,
wherein the seat comprises a child seat in a vehicle, and
wherein the user corresponds to a child passenger of the vehicle.

5. The smart seat buckle of claim 4,
wherein the child seat comprises at least one selected from a group consisting of a removable child seat installable in the vehicle and a built-in child seat in the vehicle.

6. The smart seat buckle of claim 1, wherein preventing locking of the vehicle door from outside of the vehicle further comprises:
deactivating an exterior locking function of the vehicle door.

7. A seat comprising:
a smart seat buckle having a plurality of connector elements configured to:
fasten a user to the seat when the smart seat buckle is in a fastened position; and unfasten the user from the seat when the smart seat buckle is in an unfastened position;

a sensor switch coupled to the plurality of connector elements and configured to:

detect the fastened position and the unfastened position of the smart seat buckle;

switch on battery power to a battery powered transmitter when the smart seat buckle is in the fastened position; and switch off the battery power to the battery powered transmitter when the smart seat buckle is in an unfastened position; and the battery powered transmitter configured to:

transmit a signal, when the battery power of the transmitter is switched on, in response to the sensor switch detecting the fastened position of the smart seat buckle, and cease to transmit the signal, when the battery power of the transmitter is switched off, in response to the sensor switch detecting the unfastened position of the smart seat buckle, wherein the signal prevents, in response to the signal transmitted from the battery powered transmitter, locking of a vehicle door from outside of the vehicle by at least blocking an exterior signal transmitted from a key or other locking apparatus outside of the vehicle, and wherein blocking the exterior signal transmitted from the key or other locking apparatus outside of the vehicle comprises:

receiving, by the key or other locking apparatus, the signal, wherein the received signal prevents the key or other locking apparatus from transmitting the exterior signal.

8. The seat of claim 7, wherein the plurality of connector elements comprise:

a male connector element and a female connector element, wherein the fastened position corresponds to the male connector element engaged with the female connector element based on a metallic contact, wherein the fastened position is detected based on the metallic contact, and wherein the sensor switch is integrated in the smart seat buckle.

9. The seat of claim 7, wherein the seat comprises a child seat in a vehicle, and wherein the user corresponds to a child passenger of the vehicle.

10. The seat of claim 9, wherein the child seat comprises a removable child seat installable in the vehicle.

11. The seat of claim 9, wherein the child seat comprises a built-in child seat in the vehicle.

12. The seat of claim 7, wherein preventing locking of the vehicle door from outside of the vehicle further comprises:

deactivating an exterior locking function of the vehicle door.

13. A method comprising:

providing a smart seat buckle having a plurality of connector elements configured to:

fasten a user to a seat when the smart seat buckle is in a fastened position; and unfasten the user from the seat when the smart seat buckle is in an unfastened position;

detecting, using a sensor switch of the smart seat buckle, the fastened position and the unfastened position, and the sensor switch configured to:

switch on battery power to a battery powered transmitter when the smart seat buckle is in the fastened position; and switch off the battery power to the battery powered transmitter when the smart seat buckle is in an unfastened position;

transmitting, using the battery powered transmitter, a signal in response to the battery power of the transmitter being switched on when the sensor switch detects the fastened position; and stopping the battery powered transmitter from transmitting the signal in response to the battery power of the transmitter being switched off when the sensor switch detects the unfastened position, wherein the signal prevents, in response to the signal transmitted from the battery powered transmitter, locking of a vehicle door from outside of the vehicle by at least blocking an exterior signal transmitted from a key or other locking apparatus outside of the vehicle, and wherein blocking the exterior signal transmitted from the key or other locking apparatus outside of the vehicle comprises:

receiving, by the key or other locking apparatus, the signal, wherein the received signal prevents the key or other locking apparatus from transmitting the exterior signal.

14. The method of claim 13, wherein preventing locking of the vehicle door from outside of the vehicle further comprises:

deactivating an exterior locking function of the vehicle door.

* * * * *